Aug. 4, 1964 L. R. HARPER 3,143,312

TAPE DRIVE

Filed Jan. 8, 1962 2 Sheets-Sheet 1

INVENTOR.
LEONARD ROY HARPER
BY
Otto Schmid, Jr.
AGENT

United States Patent Office 3,143,312
Patented Aug. 4, 1964

3,143,312
TAPE DRIVE
Leonard R. Harper, San Jose, Calif., assignor to International Business Machines Corporation, New York, N.Y., a corporation of New York
Filed Jan. 8, 1962, Ser. No. 164,835
6 Claims. (Cl. 242—55.12)

This invention relates to apparatus for reeling, unreeling and feeding tape, and more particularly to a machine for feeding the record tape through a record reading and/or recording head.

With the advent of electronic computing machines the need for rapid data input and data recording means has become very acute. Heretofore the speed at which data could be read from or recorded upon a record medium was in part limited by the speed at which existing equipment could feed such records through a record sensing or recording station.

Record tape feeding mechanism capable of feeding a record tape through a reading and recording head at high speed has been developed This high speed tape feeding equipment provides rapid acceleration, rapid deceleration, and rapid braking routes to meet the requirements of the electronic computing machines, for example, one such tape system employs vacuum columns in which tape loops are maintained at a substantially constant length to provide a means for obtaining a rapid acceleration and deceleration of the tape. These high performance tape systems require a certain minimum amount of control circuitry, for example, the system mentioned above requires both vacuum control switches and electric control circuitry to control the electrically operated clutches. Although the tape systems perform well, the expense required to obtain the high performance is not justified in a low cost data processing system.

It is therefore an object of the present invention to provide a record tape feeding mechanism at a low cost which is capable of feeding a record tape through a record reading or reproducing head at moderate speed.

It is a further object of the invention to provide a record tape feeding mechanism having a moderate rate of tape acceleration and deceleration.

It is another object of the invention to provide a record tape feeding mechanism having pneumatic clutch means for selectively driving the tape reels.

It is a still further object of the invention to provide a record tape feeding mechanism having pneumatic clutch means for selectively driving the tape reels wherein the pneumatic clutch means is actuated directly from the tape column.

According to the invention, a tape feeding mechanism is provided having a pair of tape reels which may be independently rotated for reeling tape thereon. Each tape reel is power driven through a pneumatic clutch mechanism which is adapted to selectively drive the reel in one direction. The clutch mechanisms are under control of the position of a tape loop depending from each reel into a tape column and serve to maintain the tape loops substantially constant in length. The tape loops are disposed in the tape columns which are provided with a source of air pressure at one end and a source of partial vacuum at the other end. A sensing port is located intermediate the ends of the tape columns and the condition of the pressure at the port is sensed by the clutches by means of a connection between the ports and the operating chamber of the clutches. The position of the tape loop within the tape column relative to the sensing port determines whether the clutch is exposed to pressure or a partial vacuum and thus determines whether the clutch is engaged or disengaged.

The foregoing and other objects, features and advantages of the invention will be apparent from the following more particular description of a preferred embodiment of the invention as illustrated in the accompanying drawings.

Figure 1:
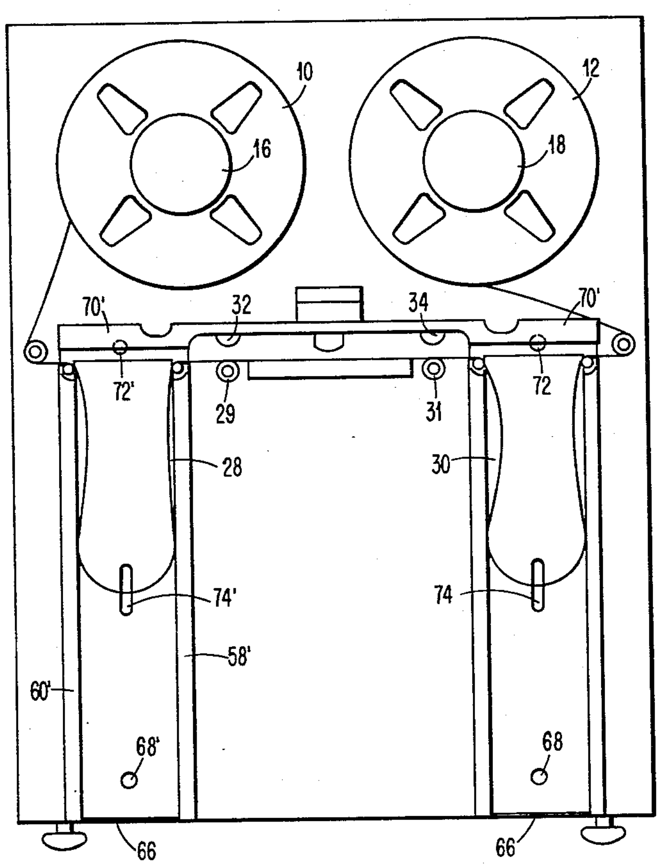
FIG. 1 is a front elevational view of a tape feeding mechanism embodying the invention.
Figure 2:
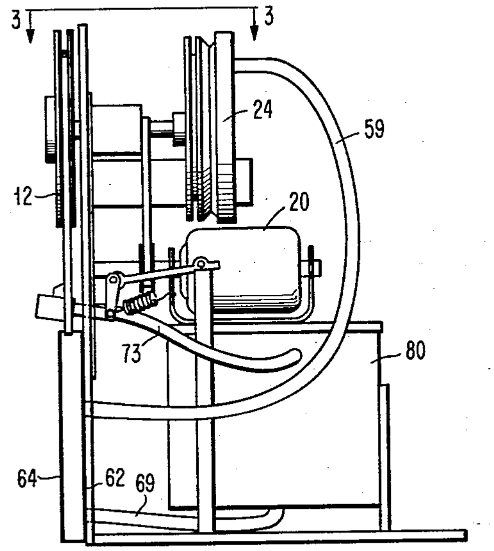
FIG. 2 is a side elevational view of the tape feeding mechanism with the outer casing removed to show the location of underlying mechanism.

A general understanding of the machine and its function may be attained by reference to FIGS. 1 and 2 of the drawings. A pair of tape reels 10, 12 adapted to hold a coil of record tape are intermittently driven to provide a pair of tape loops upon which the mechanism for feeding the tape through a tape sensing head 14 may call as the tape is to be fed in either of two directions. A tape reel which will be designated as a file reel 10 is mounted on a drive spindle 16. It may be assumed that the reel has thereon a coil of tape on which data has been recorded and from which the tape is to be fed through the tape reading and recording head 14. In its forward feed direction, the tape will pass through the tape reading head 14 and will be coiled on a second reel 12 which will be designated as a machine reel. The machine reel 12 is mounted on a drive spindle 18.

The file reel drive spindle and machine reel drive spindle are selectively rotated by suitable drive means. In the embodiment shown a single drive motor 20 is used to drive both reels. The motor normally imparts constant drive to a pair of pneumatic clutch mechanisms 24, 26 mounted on each of the drive spindles. The nature of the pneumatic clutches will be developed in greater detail at a later point. Upon selective clutching of the pneumatic clutch mechanisms in drive relation to the drive spindles, these spindles, and consequently the tape reels attached thereto, may be caused to reel tape on the coil thereon.

It is important that a supply of tape be provided with little load or tension thereon to provide for quick acceleration and deceleration of the tape through the tape head, and to this end the driving mechanism for the reels provides a pair of tape loops disposed in a pair of tape columns 28, 30. Each of the columns has means responsive to the position of the respective tape loops for maintaining a relatively stable position of these loops within the columns. The loop sensitive means within the columns control the reel drive mechanism in such manner that the loops are maintained substantially contsant in length. The tape reel drive mechanism for each reel operates independently of the other and both reels are driven independently of feed of tape through the tape head.

Tape from the loop supply in the columns is driven through the tape head by means of a pair of constantly rotating tape drive capstans. In FIG. 1 a tape drive capstan 29 may be deemed to be constantly rotated in a clockwise direction and may consequently be designated the reverse drive capstan. A similar constantly rotating capstan 31 may be deemed to be driven in a counterclockwise direction, and may, therefore, be designated the forward drive capstan. In connection with the drive capstans there are provided a pair of solenoid operated pinch rolls 32, 34, and the pinch rolls are adapted to move a tape trained thereabout into driving contact with the tape drive capstan.

Referring to FIG. 2 of the drawings it will be seen that the drive motor 20 is mounted on supporting structure 36 in such position that the motor shaft 40 extends forwardly into substantially vertical alignment with the drive portion of the pneumatic clutch structures. The clutches are in substantial transverse alignment on their respective shafts and the clutches are driven in a clockwise direction by the drive motor through drive belts 23, 25.

Referring to FIG. 1 of the drawings, it can be seen that the file reel 10 is disposed for tape winding when driven in a clockwise direction. In light of this arrangement the clutch operates as a reeling clutch for the file reel when the clutch is operated.

Figure 3:
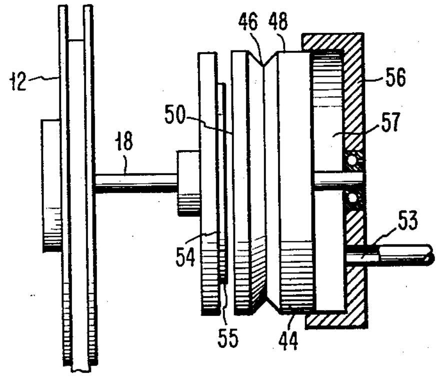
FIG. 3 is a view on line 3—3 of FIG. 2 illustrating the details of the reel drive clutch.
Figure 4:
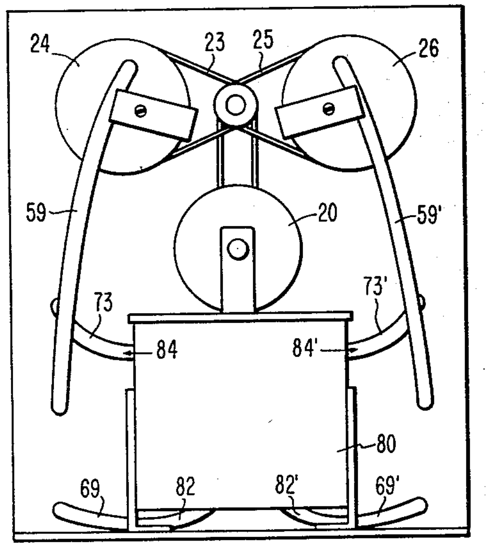
FIG. 4 is a rear view of the tape feeding mechanism showing the drive mechanism.

FIG. 3 of the drawings illustrates the specific nature of the clutch units. These units are of identical structure and a description of one of the clutches will therefore suffice as a description for both. The driven member 44 is mounted on the shaft for longitudinal sliding movement and also for free rotation thereon. The driven member comprises a driving portion 46 and a clutching portion 48. One face 50 of the driven member is adapted to frictionally engage the driving member 52. The driving member 52 comprises a disk-shaped member keyed to the shaft by means of a suitable keying structure. The face 54 of the driving member adjacent the driven member is provided with a suitable friction material 55 such as cork neoprene, for example. A housing member 56 is attached to the shaft on the opposite side of the driven member from the driving disk. A housing member contains a substantially cylindrical cavity 57 having an open end disposed toward the driven member. The inside diameter of the cylindrical cavity 57 is slightly greater than the diameter of the clutching 48 portion of the driven member 44 so that a substantially air tight joint results when the clutching portion of the driven member is moved into the cylindrical cavity of the housing member. On the closed end of the housing member is provided a port 58 which is connected by line 59 directly to the loop responsive means in the tape control columns.

It will be apparent now that when the driven member 44 is caused to move to the left as shown in FIG. 3, drive will be imparted to the shaft such drive coupling being achieved through the frictional engagement between the driving member and the driven member. The means for effecting the movement of the driven member to the left comprises the means for sensing the condition of pressure from the tape loop control means. When a pressure is present at the port 74 caused by the tape loop being below the sensing port 74 the driven member 44 is moved to the left by the pressure thereby causing engagement of the clutch which winds tape on the reel thereby shortening the tape loops. When a partial vacuum is present at the port 74 due to the tape loop being above the sensing port 74, the driven member 44 is moved to the right as shown in FIG. 3 thereby causing the clutch to be disengaged. The action of the partial vacuum below the tape and the pressure above the tape will pull tape off the reel restoring the tape loop to its equilibrium position. The other clutch is of the same construction as that described above and the mounting on its respective shaft is the same; therefore, it can be seen that the energization of the clutches will result in a corresponding drive of the respective spindles.

It has been mentioned heretofore that the position of the tape loops in control columns is utilized to control the rotary movement of the tape reel. Herein by way of example, there has been illustrated a vacuum control system for achieving this objective. The tape control columns 28, 30 are of the same construction and their specific nature may best be seen in FIGS. 1 and 2 of the drawings. The columns herein illustrated comprise a pair of sidewalls 58, 60, a back panel 62, a transparent face plate 64, and a bottom wall 66 all joined together in air tight contact. At the base of a column is a port 68 which is connected by line 69 to a vacuum source adapted to be driven by a suitable power source. The foregoing provides a structure by means of which the control columns may be evacuated when the upper ends thereof are closed against the atmosphere. Closing the upper end of each control column to the atmosphere is a guide structure 70. The guide structure comprises a cavity into which a port 72 enters. The port 72 is connected through line 73 to a suitable pressure source which is adapted to be driven by a suitable motor. In the embodiment shown the vacuum source and the pressure source are both provided by a fan mounted in a closed container 80 and driven by motor 20 so that a partial vacuum is present at port 82 and an increased pressure is present at port 84. A pair of tape guides are provided at the top of each tape column which serve to support the opposite bights of a tape loop within the control column and the guide structure is adapted to be placed adjacent the tape guides 70 so that a substantially air tight guide is formed. The guide structures are mounted so that they may be moved (by means not shown) away from the tape columns to facilitate threading the record tape across the control columns.

The sidewalls of the vacuum columns are of a width substantially equal to the width of the tape so that, when a tape loop is formed in either of the vacuum columns, the oppositely disposed marginal edges of the loop will be in substantial contact with the base plate and the face plate of the respective vacuum columns. This disposition of the tape loop within the vacuum column is assured by the tape guide structure, and the back of the tape will, through the major portion of the tape loop, substantially contact the side walls of the column thereby forming an air seal between the lower portion of the tape loop and the column walls. An elongated sensing port 74 is provided intermediate the ends of the control column to sense the pressure at this point. Thus, it can be seen that when the bottom of the tape loop is above the port 74 the pneumatic clutch will be responsive to the partial vacuum whereas if the bottom of the tape loop is below the elongated port 74, the pneumatic clutch will be responsive to the air pressure carried above the tape. The device is designed so that the tape loops in the control column are maintained substantially in the middle of the elongated port as a nominal or equilibrium position.

When the machine is turned on, the source of vacuum and the source of pressure causes the loops to form in the control columns by the action of the partial vacuum and the pressure pulling the tape off the reel. The action continues until the loop forms its optimum position approximately halfway across the elongated port 74. The drive capstans are constantly driven by means of a motor and when it is desired to feed the tape through the tape reading head 14 the solenoid operated pinch rollers 32, 34 are actuated and tape feed through the tape reading head is started. If it is desired to feed the tape through the reading head 14 in a forward direction, pinch roll 34 is actuated and this action causes the loop in the left control column 28 to shorten and the loop in the right control column 30 to become longer, thus the clutch running the file reel 10 senses a partial vacuum through the elongated slot 74′ in the left control column 28 since the tape is above the elongated slot. The vacuum disengages the clutch and the action of the pressure and the vacuum will pull more tape off the machine reel until the tape loop is restored to its equilibrium position. The feeding action causes the clutch controlling the machine reel 12 to be exposed to pressure since the tape loop in the right tape column 30 was lengthened. The pressure causes the clutch to become engaged thereby winding tape on the machine reel 12. This action continues until the tape loop reaches its equilibrium position approximately midway of the elongated sensing port at which time the clutch is disengaged.

Thus it can be seen that a tape drive is provided in which the tape loop itself acts as a valving device by means of which the clutch is selectively actuated according to the pressure sensed in the tape column. It can further be seen that there results a very simple tape drive in which complex control and sensing circuits are not required.

While the invention has been particularly shown and described with reference to a preferred embodiment thereof, it will be understood by those skilled in the art that the foregoing and other changes in the form and details may be made therein without departing from the spirit and scope of the invention.

I claim:

1. A tape drive system comprising a reel, drive means, a pneumatic clutch, a tape column provided with pressure at one end and a partial vacuum at the other end and a port intermediate the end of said tape column, means for coupling said port to said clutch, said clutch selectively actuable according to the condition of pressure sensed at said port to drive said reel, said condition of pressure determined by the position of a tape in said tape column relative to said port.

2. A tape drive system comprising a reel, drive means, pneumatic clutch means to selectively connect said drive means to said reel to drive said reel, a tape column having a source of pressure at one end and a vacuum source at the other end, a port intermediate the ends of said tape column, said pneumatic clutch means comprising a chamber, and means for coupling said chamber directly to said port in said tape column whereby said clutch is selectively actuated by the position of a tape in said tape column.

3. A drive system for a tape comprising two tape reels, drive means and a pneumatic clutch associated with each reel, a tape column for each reel, said tape column having an open end and a closed end, pressure means applied to said open end of each tape column to assist in forming a tape loop therein, vacuum means applied to said closed end of said tape column, a port intermediate the ends of said tape column, and means connecting said port with said pneumatic clutch whereby said clutch is selectively controlled by the position of a tape loop relative to said port to drive said tape.

4. In a machine having a tape processing station, mechanism for feeding a tape through said processing station comprising a pair of reels containing the record tape, a continuously rotating capstan for driving said record tape in a particular direction, reel drive means, a pair of pneumatic clutches adapted to be selectively actuated to connect said reel drive means to turn said tape reels, a tape control column associated with each reel; said tape column comprising a substantially airtight enclosure having pressure means applied to one end and partial vacuum means applied to the other end, a sensing port intermediate the ends of said tape column, said pressure and said partial vacuum cooperating to form a loop of said record tape extending into said tape column adjacent said port, means connecting said port with said pneumatic clutches whereby said pneumatic clutches are selectively actuated by the pressure at said port dependent upon the position of said loop in said tape column.

5. Means for feeding tape from a reel through a vacuum chamber to a work station including a reel, a vacuum chamber, first means for developing pressure variations in accordance with the position of said tape within said vacuum chamber and pneumatic clutch means for selectively driving said reel in response to pressure developed by said first means.

6. A tape drive system comprising a reel, drive means, a pneumatic clutch, and an evacuable tape column including means for developing pressure variations in accordance with the position of a tape within the tape column, means for coupling said pressure variation developing means to said pneumatic clutch to selectively actuate said clutch to connect said drive means to drive said reel according to the position of the tape in the vacuum chamber.

References Cited in the file of this patent

UNITED STATES PATENTS

| | | |
|---|---|---|
| 2,922,594 | Pawlowski | Jan. 26, 1960 |
| 2,997,246 | Pendleton | Aug. 22, 1961 |
| 3,036,681 | Crosby | May 29, 1962 |